United States Patent [19]

Patton, Jr. et al.

[11] 3,966,521

[45] June 29, 1976

[54] POLYURETHANE FOAM COMPOSITE

[75] Inventors: John T. Patton, Jr., Wyandotte;
Louis C. Pizzini, Trenton; John G. Demou, Lincoln Park, all of Mich.;
Gerhard G. Ramlow, East Windsor, N.J.

[73] Assignee: BASF Wyandotte Corporation, Wyandotte, Mich.

[22] Filed: June 16, 1975

[21] Appl. No.: 587,476

Related U.S. Application Data

[62] Division of Ser. No. 513,639, Oct. 10, 1974, Pat. No. 3,931,450.

[52] U.S. Cl. ............................... 156/78; 106/15 FP; 156/272; 156/306; 260/2.5 AJ; 260/2.5 AT; 260/33.2 R; 264/45.5; 428/311; 428/315; 428/425

[51] Int. Cl.² ......................................... B32B 5/20

[58] Field of Search .................... 156/78, 272, 306; 260/33.2 R, 2.5 AJ, 2.5 AT; 264/45.1, 45.5, 46.4; 428/311, 425, 315; 106/15 FP

[56] References Cited

UNITED STATES PATENTS

| | | | |
|---|---|---|---|
| 3,383,351 | 5/1968 | Stamberger | 260/33.2 R |
| 3,511,007 | 5/1970 | Babcock | 156/78 |
| 3,650,853 | 3/1972 | Klinkosch | 156/78 |
| 3,690,987 | 9/1972 | Curran et al | 156/78 |

Primary Examiner—Edward G. Whitby
Attorney, Agent, or Firm—Joseph D. Michaels; Bernhard R. Swick; Robert E. Dunn

[57] ABSTRACT

Composites based on polyurethane foams heat sealed to a substrate are prepared from polyurethane foams employing a graft polyol as a component of the foam-forming reaction mixture. The resulting composites possess exceptional bonding strength.

8 Claims, No Drawings

POLYURETHANE FOAM COMPOSITE

This is a division of application Ser. No. 513,639, filed Oct. 10, 1974, now U.S. Pat. No. 3,931,450.

BACKGROUND OF THE INVENTION

1. Field Of The Invention

The present invention relates to a method of preparing composite structures comprising a layer of flexible polyurethane foam bonded to a substrate by means of heat and to the resulting composites. More particularly, the invention relates to the use of polyurethane foams prepared from graft polyols in the preparation of heat sealable composites.

2. Prior Art

Several heat sealing methods are known in the art for laminating plastic sheets together, which methods preclude the use of an adhesive. One such method, which is particularly desirable in view of its speed and ease of application, is the so-called dielectric heat sealing method. This comprises pressing the layers to be adhered together between two surfaces while applying a high-frequency voltage thereto. The heat generated by this voltage fuses the layers at the inter-face, and upon cooling and solidification of the fused inter-face, the layers become permanently bonded together. This and other heat sealing methods in general have been successfully employed in laminating polyester polyol but not polyether polyol polyurethane foam to other materials. In the case of polyurethane foam of the polyether type, difficulty was encountered in permanently heat sealing them to other materials.

Previous attempts to overcome this difficulty have included employing certain low molecular weight polyols in the foam preparation (U.S. Pat. No. 3,205,120); using a particular organic polyisocyanate in the foam preparation (U.S. Pat. No. 3,497,116); incorporating conductive particles in the foam (U.S. Pat. No. 3,499,848); applying a thin layer of a dipolar material to the foam surface before sealing it to another plastic sheet (U.S. Pat. No. 2,859,153); incorporating highly polar, reactive hydrogen-containing compounds in the foam-forming reaction mixture (U.S. Pat. No. 3,674,718); and employing various vinyl polymer fillers as one component of the urethane reaction mixture.

SUMMARY OF THE INVENTION

The present invention relates to composite structures comprising a layer of flexible polyurethane foam bonded to a covering layer by means of heat. The polyurethane foams employed in the invention are prepared employing a graft polyol as a component of the foam-forming reaction mixture. By the phrase "graft polyol" as used herein is meant a product prepared by the in situ polymerization in the presence of a free radical catalyst of an ethylenically unsaturated monomer or mixture of monomers in a polyol. It was surprising to find that foams prepared from these graft polyols could be employed in the preparation of heat-sealable composites having exceptional bonding strength.

DESCRIPTION OF THE PREFERRED EMBODIMENTS

As mentioned above, the polyurethane foams employed in the present invention are prepared from graft polyols. Graft polyols are well known in the art as evidenced by U.S. Pat. Nos. 3,383,351 and 3,652,639, as well as by U.S. Patent Application Ser. No. 311,809 filed Dec. 4, 1972, now U.S. Pat. No. 3,823,201. The graft polyols are generally prepared by the in situ polymerization in the presence of a free radical catalyst of an ethylenically unsaturated monomer or mixture of monomers in a polyol.

The polyols which may be employed in the preparation of the graft polyols are well known in the art. Both coventional polyols essentially free from ethylenic unsaturation such as those described in U.S. Pat. No. 3,383,351 and unsaturation-containing polyols may be employed in the invention. Representative polyols essentially free from ethylenic unsaturation which may be employed in the present invention are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,451; 3,190,927; and 3,346,557.

Representative polyols include polyhydroxyl-containing polyesters, polyalkylene polyether polyols, polyhydroxy-terminated polyurethane polymers, polyhydroxyl-containing phosphorus compounds, and alkylene oxide adducts of polyhydric polythioethers, polyacetals, aliphatic polyols and thiols, ammonia, and amines including aromatic, aliphatic, and heterocyclic amines, as well as mixtures thereof. Alkylene oxide adducts of compounds which contain two or more different within the above-defined classes may also be used such as amino alcohols which contain an amino group and a hydroxyl group. Also alkylene oxide adducts of compounds which contain one —SH group and one —OH group as well as those which contain an amino group and a —SH group may be used.

Any suitable hydroxyl-containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethylglutaric acid, α-β-diethylsuccinic acid, isophthalic acid, terephthalic acid, hemimellitic acid, and 1,4-cyclohexanedicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-(4,4'-hydroxyphenol)-propane, commonly known as Bisphenol A.

Any suitable polyalkylene polyether polyol may be used such as the polymerization product of an alkylene oxide or of an alkylene oxide with a polyhydric alcohol having from 2 to 6 hydroxyl groups. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)propane and blends thereof having equivalent weights of from 250 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amino aniline, 1,5-diamino naphthalene, methylene dianiline, the condensation products of aniline and formaldehyde, and 2,4-diamino toluene; aliphatic amines such as methyl amine, triisopropanol amine, ethylene diamine, 1,3-propylene diamine, 1,4-butylene diamine, and 1,3-butylene diamine.

The unsaturation-containing polyols which may be employed may be prepared by the reaction of any conventional polyol such as those described above with an organic compound having both ethylenic unsaturation and a hydroxyl, carboxyl, or epoxy group. They may also be prepared by employing an organic compound having both ethylenic unsaturation and a hydroxyl, carboxyl, or epoxy group as a reactant in the preparation of the conventional polyol. Furthermore, they may be prepared by the reaction of a suitable polyol having from two to eight hydroxyl groups with a monoester, a halogen-containing compound or an isocyanate-terminated compound, each of which contains a polymerizable carbon-to-carbon double bond, or with a compound, such as acetylene, which upon reaction yields a polymerizable carbon-to-carbon double bond.

Specifically, the unsaturation-containing polyols may be prepared: (1) by the reaction of a polyol with a compound such as maleic anhydride; (2) by employing a compound such as allyl glycidylether in the preparation of the unsaturation-containing polyol; (3) by the transesterification reaction of a polyol with ethyl acrylate, methyl methacrylate, or a similar compound, or by the esterification of the said polyol with acrylic acid, methacrylic acid, etc.; (4) by the reaction of the sodium or potassium metal salt of a polyol with allyl chloride or vinyl chloride; or (5) by the reaction of a polyol with acetylene. Additionally, the product of the reaction of a stoichiometric excess amount of toluene diisocyanate with a compound having an active hydrogen and a polymerizable carbon-to-carbon double bond such as 2-hydroxypropyl methacrylate may be reacted with a polyol to yield a hydroxy-terminated organic compound containing a polymerizable carbon-to-carbon double bond. Alternatively, a similar compound may be prepared by treating the prepolymer resulting from the reaction of toluene diisocyanate with a polyol with compounds such as 2-hydroxyethyl acrylate, 4-hydroxybutyl acrylate and the like.

Representative of the organic compounds having both ethylenic unsaturation and a hydroxyl, carboxyl or epoxy group which may be used include unsaturated polycarboxylic acids and anhydrides such as maleic acid and anhydride, fumaric acid, crotonic acid and anhydride, propenyl succinic anhydride, and halogenated maleic acids and anhydrides; unsaturated polyhydric alcohols such as 2-butene-1,4-diol, glycerol allylether, trimethylolpropane allylether, pentaerythritol allylether. pentaerythritol vinylether, pentaerythritol diallylether, and 1-butene-3,4-diol; unsaturated epoxides such as 1-vinylcyclohexane-3,4-epoxide, butadiene monoxide, vinyl glycidylether(1-vinyloxy-2,3-epoxy propane), glycidyl methacrylate and 3-allyloxy-propylene oxide (allyl glycidylether). If a polycarboxylic acid or anhydride is employed to incorporate unsaturation into the compounds, it is then preferred to react the resulting compounds with an alkylene oxide, preferably ethylene or propylene oxide, to replace the carboxyl groups with hydroxyl groups prior to employment in the present invention. The amount of alkylene oxide employed is such to reduce the acid number of the hydroxy-terminated organic compound to about one or less. Representative ester-containing compounds containing a polymerizable carbon-to-carbon double bond include methyl acrylate, ethyl acrylate, propyl acrylate, n-butyl acrylate, and the corresponding methacrylates. Representative halogen-containing compounds containing a polymerizable carbon-to-carbon double bond include vinyl chloride, allyl chloride, acrylyl chloride, methacrylyl chloride, vinyl bromide, allyl bromide, acrylyl bromide and methacrylyl bromide.

To prepare the unsaturation-containing polyols from about 0.05 mole to about 3.0 moles, preferably from 0.30 mole to 1.50 moles, of said organic compound per mole of polyol is employed. The preparation of the unsaturation-containing polyols employed in the present invention follows conventional prior art procedures such as disclosed in U.S. Pat. Nos. 3,275,606 and 3,280,077. Generally, this requires a reaction at a temperature between 0°C. and 130°C. Both acidic catalysts, such as Lewis acid catalysts and basic catalysts such as alkali metal hydroxides, may be used. In addition, a non-catalyzed reaction may be used employing temperatures between 50°C. and 200°C.

As mentioned above, the graft polyols are prepared by the in situ polymerization of the above-described polyols with an ethylenically unsaturated monomer or a mixture of ethylenically unsaturated monomers. Representative ethylenically unsaturated monomers which may be employed in the present invention include butadiene, isoprene, 1,4-pentadiene, 1,6-hexadiene, 1,7-octadiene, styrene, $\alpha$-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl$\alpha$-chloroacrylate, ethyl$\alpha$-ethoxyacrylate, methyl$\alpha$-acetaminoacrylate, butyl acrylate, 2-ethylhexylacrylate, phenyl acrylate, phenyl methacrylate, $\alpha$-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl chloride, vinyl fluoride, vinylidene bromide, vinylidene chloride, 1-chloro-1-fluoro-ethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2ethylmercaptoethyl ether, vinyl methyl ketone, vinyl ethyl ketone, vinyl phosphonates such as bis($\beta$-chloroethyl)vinyl phosphonate, vinyl phenyl ketone, vinyl ethyl sulfide, vinyl ethyl sulfone, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention.

The amount of ethylenically unsaturated monomer employed in the polymerization reaction is generally from 1 to 40%, preferably from 10 to 35%, based on the weight of the polyol. The polymerization occurs at a temperature between about 80°C. and 170°C., preferably from 105°C. to 135°C.

Illustrative catalysts which may be employed are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-$\alpha$-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, $\alpha$-methylbenzyl hydroperoxide, $\alpha$-methyl-$\alpha$-ethyl benzyl hydroperoxide, Tetralin hydroperoxide, triphenylmethyl hydroperoxide, diphenylmethyl hydroperoxide, $\alpha$-$\alpha'$-azo-2-methyl butyronitrile, $\alpha,\alpha'$-2-methyl heptonitrile, 1,1'-azo-1-cyclohexane carbonitrile, dimethyl$\alpha,\alpha'$-azoisobutyrate, 4,4'-azo-4-cyanopentanoic acid, azobis(isobutyronitrile), persuccinic acid, diisopropyl peroxy dicarbonate, and the like; a mixture of catalysts may also be used. Azobis-(isobutyronitrile) is the preferred catalyst. Generally from about 0.5% to about 10%, preferably from about 2% to about 5%, by weight of catalyst based on the weight of the monomer will be employed in the process of the invention.

The polyurethane foams employed in the present invention are generally prepared by the reaction of a graft polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4-and 2,6-tolylene diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4'-triphenylmethane triisocyanate, polymethylene polyphenylisocyanate and tolylene 2,4,6-triisocyanate; and the tetraisocyanates such as 4,4'-dimethyldiphenylmethane-2,2', -5,5'-tetraisocyanate. Especially useful due to their availability and properties are tolylene diisocyanate, diphenylmethane-4,'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the graft polyols may be employed along with another polyhydroxyl-containing component commonly employed in the art. Any of the polyhydroxyl-containing components which are described above for use in the preparation of the graft polyols may be employed in the preparation of the polyurethane foams useful in the present invention.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine, 1,4-cyclohexane-bis-(methylamine), ethylene diamine, diethylene triamine, N-(2-hydroxypropyl)ethylene diamine, N,N'-di(2-hydroxypropyl)ethylene diamine, piperazine, 2-methylpiperazine, morpholine, and dodecahydro-1,4,7,9b-tetrazaphenalene.

Any suitable catalyst may be used including tertiary amines, such as for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organo metallic compounds such as are disclosed in U.S. Pat. No. 2,846,408.

A wetting agent or surface-active agent is generally necessary or production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

In a preferred embodiment of the present invention, a phosphorus-containing organic ingredient is employed along with the graft polyol in the preparation of the polyurethane foam. Illustrative phosphorus-containing organic compounds include O,O-diethyl-n,n-bis(2-hydroxyethyl)aminomethyl phosphonate, tris (β-chloroethyl)phosphate, tricresylphosphate, triphenylphosphate, cresyldiphenylphosphate, tris(2,3-dibromopropyl)phosphate, tris(trichloropropyl)phosphate, 2,2-bis(chloromethyl)trimethylene-bis[bis(2-chloroethyl)-phosphate], and tris(chlorobromopropyl)phosphate. Any phosphorus-containing organic compound which does not break down, i.e., one which does not react with isocyanate groups, may be employed in the invention. In addition to imparting fire-retardant properties, the phosphorus-containing compounds reduce the brittleness and friability of the foam. Generally, from one part to 15 parts by weight of phosphorus-containing compound based on 100 parts of graft polyol will be employed.

As a result of the inclusion of a graft polyol in the polyurethane foam-forming reaction mixture, the resulting foam is rendered heat sealable to other substrates. The composites of the invention comprise at least one layer of urethane foam which has been heat sealed to at least one layer of a substrate. The substrates which can be employed include spun, woven, knitted, felted, matted, and the like textile fabrics produced from natural and synthetic fibers such as cotton, wool, silk, linen, jute, hemp, sisal, nylon, polyester, polyacrylonitrile, vinyl chloride-acrylonitrile copolymer, rayon, polyurethane spandex, and the like. Other useful substrates include plastic film prepared from poly(vinyl chloride), vinyl chloride-vinyl acetate copolymers, vinylidene chloride homopolymers and copolymers, cellophane, polyethylene, polypropylene, polystyrene, and the like. Still further useful substrates include wood, glass, metal, stone, cement, various plastics, plastic foams, and the like. The preferred substrates include fabrics and films produced from homo- and copolymers of vinyl chloride.

The composites of the invention are produced by heating part or all of the surface of the urethane foam described above to a temperature above the fusion temperature of the foam to form a tacky liquid or semi-liquid layer, and thereafter or concurrently with the heating operation, applying the substrate to the tacky surface of the foam and holding in contact therewith while cooling until the surface cools and resolidifies, thereby forming an adhesive bond between the foam and the substrate. The fusion temperature of the foam will vary depending upon the nature and proportion of the components therein, but in general is in the range of from about 400°F. to about 600°F. It is in general desirable not to heat the surface of the foam to a temperature higher than about 100°F. above the fusion temperature of the particular foam. In keeping the substrate in contact with the tacky surface of the foam until said surface has cooled and resolidified, it is desirable to employ a moderate amount of pressure in order to maintain the foam and substrate in contact. The pressure can be as low as that resulting from the weight of the foam or the substrate, but is preferably of the order of from about 0.1 to about 100 or more pounds per square inch. The heat can be applied to the surface of the foam by any convenient means, for example, a flame, dielectric heating, a hot surface such as a "hot plate", "hot bar or die", or by the use of high frequency sound energy.

The several types of composites that are provided by the invention are widely useful. For instance, the fabric-urethane foam composites are useful in the production of padded clothing, insulation, cushions, and the like. The composites provided by the invention are generally widely useful in the production of cushioning, heat and sound insulation, crash pads and the like.

The following examples illustrate the nature of the invention. All parts are by weight unless otherwise stated. In the examples, the physical properties of the polyurethane were determined by the following ASTM tests:

| | |
|---|---|
| Tensile Strength | D-412 |
| Modulus | D-412 |
| Elongation | D-412 |
| Split Tear | D-470 |
| Compression Set | D-395 |
| Compression Load | D-1564 |
| Humid Aging | D-1564 |

EXAMPLE I

A. Preparation Of An Unsaturated Polyether Polyol

A stainless steel autoclave equipped with a thermometer, stirrer, nitrogen source, inlet means and heat exchange means was charged with 21.8 parts of propylene glycol and 312 parts of a 325 molecular weight polyol prepared by the condensation in the presence of potassium hydroxide of four moles of propylene oxide with one mole of glycerol. The charge was purged with nitrogen and heated to 105°C. With constant stirring, a mixture of 4,564 parts of propylene oxide and 41.6 parts (corresponding to 0.30 mole per mole of product) of allyl glycidyl ether was gradually added to the reaction mixture over ten hours. Upon completion of the oxide addition, the reaction mixture was maintained at 105°C. for four hours. Thereafter, 870 parts of ethylene oxide was added over a period of 1.5 hours at a temperature of 105°C. After the addition was completed, the reaction mixture was maintained at 105°C. for an additional hour. The reaction mixture was cooled to 30°C. and discharged from the autoclave. The reaction product was treated with an adsorbent, filtered to remove the catalyst and stripped at 100°C. for one hour under less than 5 millimeters of mercury to remove volatiles. The product, a clear colorless liquid, had a hydroxyl number of 35, an acid number of 0.01, a refractive index at 25°C. of 1.4534, and a Brookfield viscosity at 25°C. of 900 cps.

B. Preparation Of Graft Polyol

A reaction vessel equipped as described above was charged with 350 parts of the unsaturated polyol prepared in (A), above. Nitrogen was bubbled through the polyol for about 1 hour. With stirring and under a slight nitrogen flow, the charge was heated to 115°C. A stream of a mixture of 62 parts of acrylonitrile and 55 parts of styrene and a stream of 2.5 parts of azobis-(isobutyronitrile) in 150 parts of the unsaturated polyol were fed into a KENICS static mixer and continuously added to the charge over a period of ninety minutes at 115°C. Upon completion of the addition, the reaction mixture was maintained at 115°C. for 20 minutes. The reaction mixture was then stripped for 1 hour at 105°C. under less than 5 millimeters of mercury. The stripped reaction product was a homogeneous liquid dispersion having a Brookfield viscosity at 25°C. of 2,000 cps. and a hydroxyl number of 28.

C. Preparation Of Polyurethane Foam And Composite

A polyurethane foam was prepared by reacting the following ingredients and amounts thereof:

| Ingredient | Amount, pbw |
|---|---|
| Graft polyol | 350 |
| Water | 9.5 |
| Triethylene diamine | 0.4 |
| Silicone surfactant | 7.0 |
| N-ethyl morpholine | 1.8 |
| Stannous octoate | 0.1 |
| Tricresyl phosphate | 35 |
| Dioctyl phthalate | 17.5 |
| Toluene diisocyanate | 95 |
| Polymethylene polyphenyl-isocyanate | 24 |

The resulting foam had a density of 3.2 lbs./ft$^3$ and an air flow of 0.4 cfm. A ½ inch thick piece of the foam was dielectrically sealed to the smooth face and to the fabric side of vinyl sheets using a Thermatron K-41-S dielectric sealing machine. The conditions of the dielectric heat seal were: Seal Time, 6 sec.; Cool Time, 1.5 sec.; Power, 4 KW, 30 MC; and Line Pressure, 100 lbs./in$^2$. The tear resistance of the seal was evaluated by pulling the two pieces of vinyl film on an Instron tester. The bond strength measured at 10 pounds per inch. A control foam prepared as described above, differing in that the polyol employed was a 3,000 molecular weight propylene oxide adduct of glycerine, was also heat sealed to vinyl. The tear resistance of the seal was evaluated to be 4 pounds per square inch.

EXAMPLE II

Polyurethane foams were prepared employing the following polyols:

Polyol A — A 3000 molecular weight propylene oxide adduct of glycerol (hydroxyl number of 56).

Polyol B — A graft polyol having a hydroxyl number of 40 and a vinyl polymer content of 20% by weight prepared by the in situ polymerization of an equal weight mixture of styrene and acrylonitrile in a 3,300 molecular weight polyol prepared by the sequential addition of ethylene oxide and a mixture of propylene oxide and allyl glycidyl ether to glycerol, said polyol having an oxyethylene content of 10% by weight.

Polyol C — A graft polyol having a hydroxyl number of 45 and a vinyl polymer content of 18% by weight prepared by the in situ polymerization of an approximately equal weight mixture of acrylonitrile and styrene in a 3,000 molecular weight propylene oxide adduct of glycerol.

The ingredients employed in the preparation of the foams and the amounts thereof were as follows:

| Ingredients | Parts by Weight |
| --- | --- |
| Polyol A, B or C | 300 |
| Water | 9.0 |
| Bis(2-N,N-dimethylamino-ethyl)ether | 0.3 |
| Stannous octoate | 0.5 |
| Silicone surfactant | 4.5 |
| Toluene diisocyanate (80/20 mixture 2,4- 2,6-isomer) | 105 Index |

Foam composites were prepared by heat sealing ½ inch slices of foam to clear and to orange vinyl strips. The seals were made with a Vertrod Thermal Impulse Heat Sealing Machine, Model 14PS-SP, Serial No. V-9152, Watts 1150. The sealing occurred using a machine setting of 80 pounds pressure and 40 volts. Heat/Dwell settings of 8/5 and 10/10 were employed. The adhesive strength of the seals was evaluated. The results obtained are presented in Table I, below. As the data in the table indicate, composites prepared from those foams derived from graft polyols exhibit improved bonding strength over composites prepared from foams derived from conventional polyols.

Table I

| Foam | Polyol | Foam Density, pcf. | Adhesion Strength, pi. Heat/Dwell | | | |
| --- | --- | --- | --- | --- | --- | --- |
| | | | Clear Film: | | Orange Film: | |
| | | | 8/5 | 10/10 | 8/5 | 10/10 |
| 1 | A | 1.9 | 1.02 | 1.30 | 0.79 | 1.07 |
| 2 | B | 1.8 | 1.24 | 1.62 | 1.13 | 1.65 |
| 3 | C | 1.9 | 1.35 | 1.64 | 0.86 | 1.89 |
| 4 | A | 2.0 | 0.91 | 0.98 | 0.69 | 0.87 |
| 5 | B | 2.0 | 0.84 | 1.22 | 0.70 | 1.23 |
| 6 | C | 2.0 | 0.90 | 1.15 | 0.61 | 1.08 |
| 7 | A | 2.2 | 0.88 | 1.20 | 0.68 | 0.85 |
| 8 | B | 2.1 | 1.05 | 1.36 | 1.03 | 1.22 |
| 9 | C | 2.2 | 1.09 | 1.55 | 0.77 | 1.13 |

EXAMPLE III

A polyurethane foam composite was prepared in the manner described in Example I. The foam employed was prepared from the following ingredients and amounts thereof.

| Ingredients | Parts by Weight |
| --- | --- |
| Polyol D | 100 |
| Water | 3.6 |
| Silicone surfactant | 1.0 |
| Triethylene diamine | 0.2 |
| Stannous octoate | 0.15 |
| 2,2-Bis(chloromethyl)tri-methylene bis[bis(2-chloroethyl)phosphate] | 5 |
| Toluene diisocyanate (80/20, 2,4- 2,6-isomer mixture) | 43 |

Polyol D is a graft polyol having a hydroxyl number of 33 and a vinyl polymer content of 35% by weight, prepared by the in situ polymerization of a mixture of styrene, acrylonitrile and bis(β-chloroethyl)vinyl phosphonate in a 3,300 molecular weight polyol prepared by the sequential addition of ethylene oxide and a mixture of propylene oxide and allyl glycidyl ether to glycerol, said polyol having an oxyethylene content of about 10% by weight.

The resulting polyurethane foam had a density of 1.62 pcf. A composite prepared from this foam exhibited excellent seal strength. Moreover, the seals were very strong after 22 hours at 284°F. heat aging and after 5 hours at 250°F. humid aging. A composite prepared from a foam prepared from Polyol A (as described in Example II) produced essentially no seal.

EXAMPLE IV

A polyurethane foam composite was prepared in the manner described in Example I. The foam employed was prepared from the following ingredients and amounts thereof.

| Ingredients | Parts by Weight |
| --- | --- |
| Polyol E | 300 |
| Water | 9.0 |
| Silicone surfactant | 2.4 |
| Bis(2-N,N-dimethylamino ethyl)ether | 0.60 |
| Stannous octoate | 0.87 |
| Toluene diisocyanate (80/20, 2,4- 2,6-isomer mixture) | 113 |

Polyol E is a graft polyol having a hydroxyl number of 45 and a vinyl polymer content of 20% by weight, prepared by the in situ polymerization of a mixture of 4% of methyl methacrylate and 16% of vinylidene chloride in a polyol having a hydroxyl number of 35 and prepared by the reaction of one mole of a 4,800 molecular weight ethylene oxide propylene oxide adduct of glycerol (oxyethylene content of 13% by weight) with one mole of maleic anhydride and six moles of ethylene oxide.

A composite was prepared in the same manner as described in Example I. The tear resistance of the seal was evaluated by pulling the two pieces of vinyl film on an Instron tester. The bond strength measured at 4.9 pounds per inch.

The embodiments of the invention in which an exclusive property or privilege is claimed are defined as follows:

1. In a process for the production of a laminated composite which comprises heat sealing a substrate to a polyurethane foam prepared by the reaction of an organic polyisocyanate with a polyol in the presence of a blowing agent the improvement which comprises employing as the polyol a graft polyol prepared by the in situ polymerization in the presence of a free radical catalyst of an ethylenically unsaturated monomer or mixture of monomers in a polyol.

2. The process of claim 1 wherein the substrate is polyvinyl chloride.

3. The process of claim 1 wherein the organic polyisocyanate is toluene diisocyanate.

4. The process of claim 1 wherein the graft polyol is prepared by the in situ polymerization in the presence of a free radical catalyst of an ethylenically unsaturated monomer or mixture of monomers in an unsaturation-containing polyol.

5. The process of claim 4 wherein the mixture of ethylenically unsaturated monomers is styrene and acrylonitrile.

6. The process of claim 4 wherein the mixture of ethylenically unsaturated monomers is styrene, acrylonitrile and bis(β-chloroethyl)vinyl phosphonate.

7. The process of claim 4 wherein the unsaturation-containing polyol is prepared by the reaction of a polyether polyol with an organic compound having both ethylenic unsaturation and a hydroxyl, carboxyl or epoxy group.

8. The process of claim 1 wherein the foam is prepared by the reaction of an organic polyisocyanate with a graft polyol in the presence of a blowing agent and a phosphorus-containing organic compound.

* * * * *